US008719593B2

(12) United States Patent
Mackey et al.

(10) Patent No.: US 8,719,593 B2
(45) Date of Patent: May 6, 2014

(54) SECURE PROCESSING DEVICE WITH KEYSTREAM CACHE AND RELATED METHODS

(75) Inventors: Christopher David Mackey, Spencerport, NY (US); Michael Thomas Kurdziel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1072 days.

(21) Appl. No.: 12/469,083

(22) Filed: May 20, 2009

(65) Prior Publication Data

US 2010/0299537 A1 Nov. 25, 2010

(51) Int. Cl.

*G06F 11/30* (2006.01)
*G06F 12/14* (2006.01)
*G06F 13/00* (2006.01)
*G06F 13/28* (2006.01)
*H04K 1/04* (2006.01)

(52) U.S. Cl.

USPC ........... 713/193; 713/189; 711/117; 711/118; 711/137; 711/204; 380/36; 380/37

(58) Field of Classification Search

USPC .......... 713/189–194; 711/137, 117, 118, 200, 711/204–205; 380/36, 37, 255

See application file for complete search history.

(56) References Cited

U.S. PATENT DOCUMENTS 5,444,781 A 8/1995 Lynn et al. .................... 380/46
6,345,359 B1 2/2002 Bianco .......................... 713/190
6,523,118 B1 2/2003 Buer ............................ 713/189
7,095,850 B1 * 8/2006 McGrew ......................... 380/42
7,469,338 B2 * 12/2008 Buer ............................ 713/170
7,505,588 B2 * 3/2009 Mironov et al. ................ 380/42
7,653,196 B2 * 1/2010 Koshy et al. .................... 380/28
7,773,754 B2 * 8/2010 Buer et al. ..................... 380/277
2003/0091185 A1 * 5/2003 Swindlehurst et al. ......... 380/44
2003/0149869 A1 8/2003 Gleichauf ..................... 713/153
2005/0021986 A1 * 1/2005 Graunke et al. ............. 713/193
2005/0220302 A1 * 10/2005 Mironov et al. ................ 380/42
2005/0223175 A1 * 10/2005 Hepner et al. ................ 711/137
2005/0240764 A1 * 10/2005 Koshy et al. .................. 713/170
2006/0179239 A1 * 8/2006 Fluhr et al. .................... 711/137
2007/0192632 A1 8/2007 Botzum et al. ................ 713/193
2007/0204108 A1 * 8/2007 Griswell et al. ............. 711/137
2007/0260838 A1 11/2007 Schwemmlein ............. 711/163
2008/0095370 A1 * 4/2008 Rose et al. .................... 380/278
2008/0279371 A1 * 11/2008 Lee et al. ....................... 380/42
2009/0183161 A1 * 7/2009 Kolinummi et al. .......... 718/102

OTHER PUBLICATIONS

Yang et al., "Improving memory encryption performance in secure processors", IEEE Transactions on Computers, vol. 54, No. 5, May 2005, pp. 630-640.

Platte, Jorg et al., "A Cache Design for a Security Architecture for Microprocessors (SAM)," Robotics Research Institute: Section Information Technology, University of Dortmund, 2006, pp. 1-15.

Duca, Nathaniel et al., "Stream Caching: Optimizing Data Flow within Commodity Visualization Clusters," 2002 pp. 1-4.

* cited by examiner

*Primary Examiner* — Tae Kim

(74) *Attorney, Agent, or Firm* — Allen, Dyer, Doppelt, Milbrath & Gilchrist, P.A.

(57) ABSTRACT

A secure processing device may include an external memory storing encrypted data, and a processor cooperating with the external memory. The processor is configured to generate address requests for the encrypted data in the external memory, cache keystreams based upon an encryption key, and generate decrypted plaintext based upon the cached keystreams and the encrypted data requested from the external memory. For example, the processor may be further configured to predict a future address request, and the future address request may be associated with a cached keystream.

16 Claims, 3 Drawing Sheets

11'
13'
15'
ADDRESS$_{32}$
Tag
Key Stream Index
16'
Expander
Index
Key Stream Cache
14'
18'
CPU
KEY$_{128/192/256}$
AES
KeyStream$_{128}$
Controller
17'
31'
128-bit Key Stream Datum
32-bit Address
Memory Page
Tag
Index
Key Stream Index
PT DATA$_{16}$
CT DATA$_{16}$
21'
20'

SECURE PROCESSING DEVICE WITH KEYSTREAM CACHE AND RELATED METHODS

FIELD OF THE INVENTION

The present invention relates to the field of processing devices, and, more particularly, to processing devices with secure external memory and related methods.

BACKGROUND OF THE INVENTION

A typical wireless communications device includes a memory, a processor cooperating with the memory, and a wireless transceiver cooperating with the processor for transmitting and receiving transmissions. The memory may store data to be processed or program code for execution by the processor. As computational demands on the typical wireless communications device have increased, the speed of the processor may be incremented to increase performance. Another approach to increasing wireless communications device performance is to reduce the time taken by the processor to access the memory, i.e. reducing memory access time.

An approach to reducing memory access time is to provide several types of memory, each with a different memory access time, for storing data. For example, the memory types may include long-term memory and short-term memory, for example, a cache. More specifically, the cache, which has a relatively quick access time, may be used to store data that is frequently accessed. Once the data is stored in the cache, future use can be made by accessing the cached copy rather than re-fetching or re-computing the original data, so that the average access time is shorter. On the other hand, the long-term memory is typically substantially larger than the cache but also includes a substantially greater memory access time.

Physically, within the typical wireless communications device, the processor and memory are typically separated, i.e. off-chip. In other words, the processor and memory are coupled together via a communication line, typically a data communications bus. In certain applications, this communications line between the processor and the memory presents a potential security risk to the computer system. For example, an unauthorized user may eavesdrop on the communications line in an attempt to perceive transmitted data from the memory, or the unauthorized user may compromise the memory and data stored therein.

An approach to this potential security risk is to encrypt ail data transmitted on this communications line between the memory and the processor. For example, as disclosed in U.S. Pat. No. 6,523,118 to Buer, a computing system includes a processor, a memory subsystem storing encrypted data, and a secure cache controller coupled between the memory and the processor. When the processor needs data stored in the memory subsystem, the processor communicates with the secure cache controller, which requests the encrypted data from the memory subsystem and subsequently decrypts the data for the processor. A potential drawback to this design is the decrease in device performance since the processor no longer directly accesses the memory subsystem.

SUMMARY OF THE INVENTION

In view of the foregoing background, it is therefore an object of the present invention to provide a secure processing device that accesses external memory efficiently.

This and other objects, features, and advantages in accordance with the present invention are provided by a secure processing device comprising an external memory storing encrypted data, and at least one processor cooperating with the external memory. The at least one processor may be configured to generate a plurality of address requests for the encrypted data in the external memory, cache a plurality of keystreams based upon an encryption key, and generate decrypted plaintext based upon the cached plurality of keystreams and the encrypted data requested from the external memory. Advantageously, this secure processing device efficiently accesses encrypted external memory using a cache of keystreams.

More specifically, the at least one processor may be further configured to predict a plurality of future address requests, and the plurality of future address requests may be respectively associated with the cached plurality of keystreams. The at least one processor may also predict the plurality of future address requests based upon at least one of a current address request and a past request address.

In some embodiments, the at least one processor may comprise a plurality thereof operating in parallel. Further, in these embodiments, the secure processing device may further comprise at least one data cross-checker cooperating with the plurality of processors operating in parallel.

Additionally, the at least one processor may comprise an address bus, a keystream cache coupled to the address bus, and a keystream generator upstream from the keystream cache. Also, the keystream generator may comprise an expander coupled to the address bus, and an encryption engine coupled to the expander and having a key input thereto to generate the plurality of keystreams.

For example, the encryption engine may comprise an advanced encryption standard (AES) engine. The at least one processor may also be configured to generate each address request comprising at least one of a key stream index value, an index value, a tag value, and a memory page value. The at least one processor may be further configured to operate based upon a direct mapped cache protocol.

Another aspect is directed to a method of operating a secure processing device including an external memory storing encrypted data, and at least one processor cooperating with the external memory. The method may comprise using the at least one processor to generate a plurality of address requests for the encrypted data in the external memory, using the at least one processor to cache a plurality of keystreams based upon an encryption key, and using the at least one processor to generate decrypted plaintext based upon the cached plurality of keystreams and the encrypted data requested from the external memory.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime/multiple prime notations are used to indicate similar elements in alternative embodiments.

Figure 1:
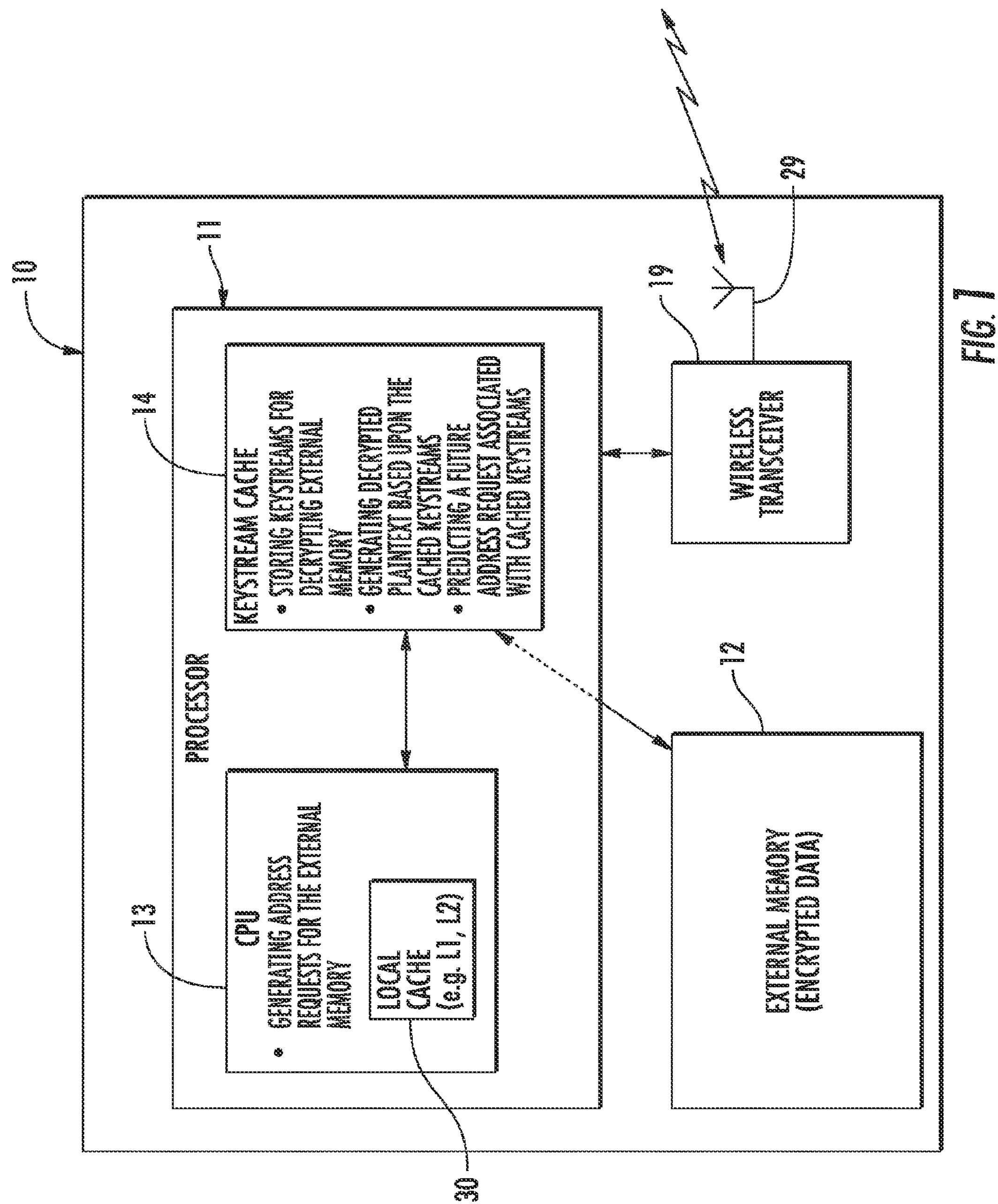
FIG. 1 is a schematic diagram of a secure wireless communications device according to the present invention.

Referring initially to FIG. 1, a secure wireless communications device 10 according to the present invention is now described. The secure wireless communications device 10 illustratively includes an external memory 12 storing encrypted data, a processor 11 cooperating therewith, a wireless transceiver 19 cooperating with the processor, and an antenna 29 coupled to the wireless transceiver.

The processor 11 illustratively includes a central processing unit (CPU) 13, and a keystream cache 14 cooperating with the CPU and the external memory 12. As will be appreciated by those skilled in the art, the CPU 13 and the keystream cache 14 are on-chip, i.e. on the same integrated circuit, whereas the external memory 12 is illustratively off-chip.

The external memory 12 may comprise, for example, random access memory. The CPU 13 may comprise, for example, a bus master processor, or the illustrated processing device with local cache 30, i.e. level-1/2 cache. As will be appreciated by those skilled in the art, the secure wireless communications device 10 may be implemented in Type-1 National Security Agency (NSA), North Atlantic Treaty Organization (NATO), Federal Information Processing Standard (FIPS) Publication 140-2, and Common Criteria for Information Technology Security Evaluation applications.

The processor 11 is configured to generate a plurality of address requests for the encrypted data in the external memory 12. As will be appreciated by those skilled in the art, the address requests are associated with corresponding memory addresses in the external memory 12, i.e. the processor 11 is requesting the data stored in the memory addresses.

Figure 2:
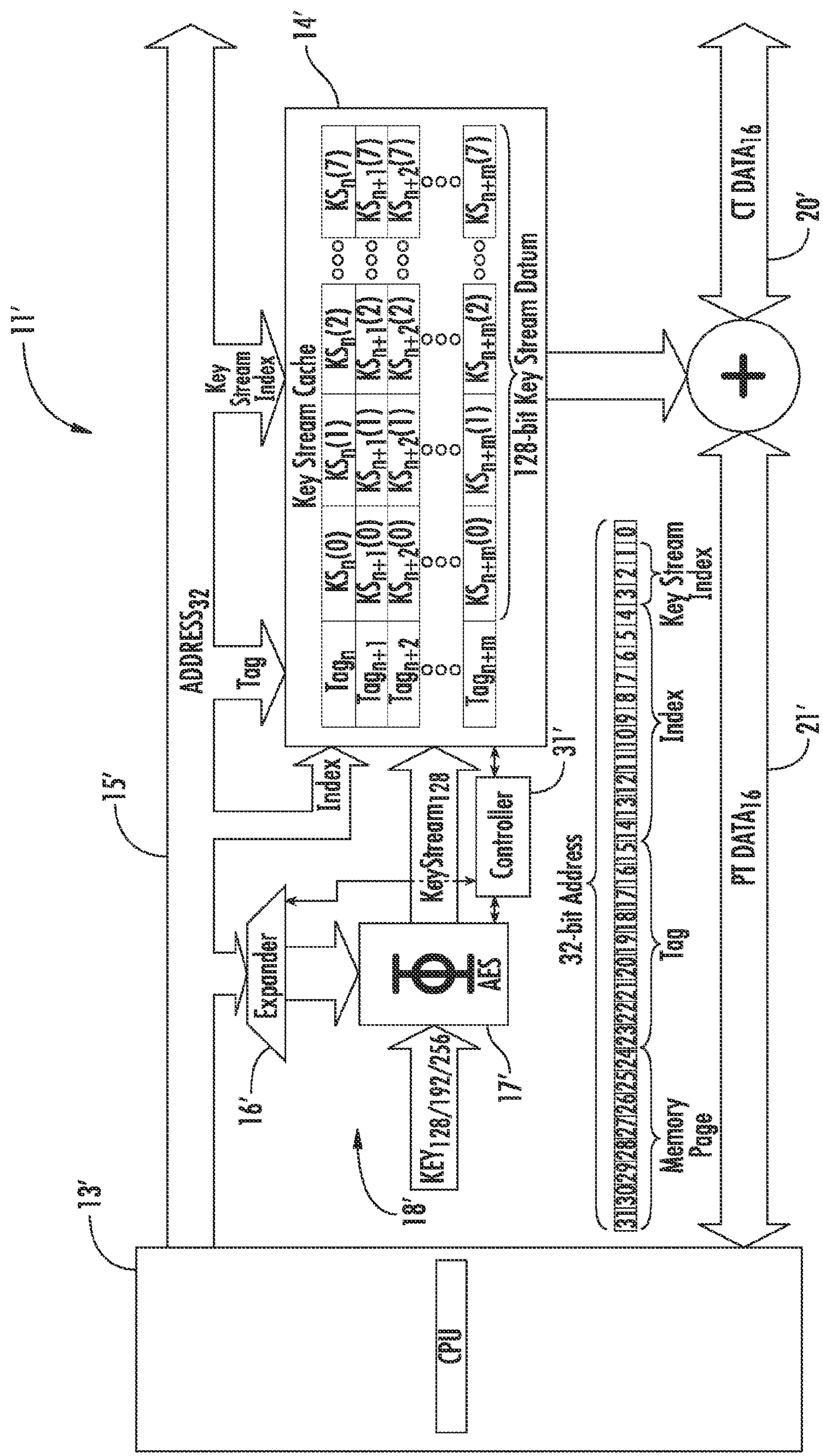
FIG. 2 is a detailed schematic diagram of another embodiment of the wireless communications device of FIG. 1.
Figure 3:
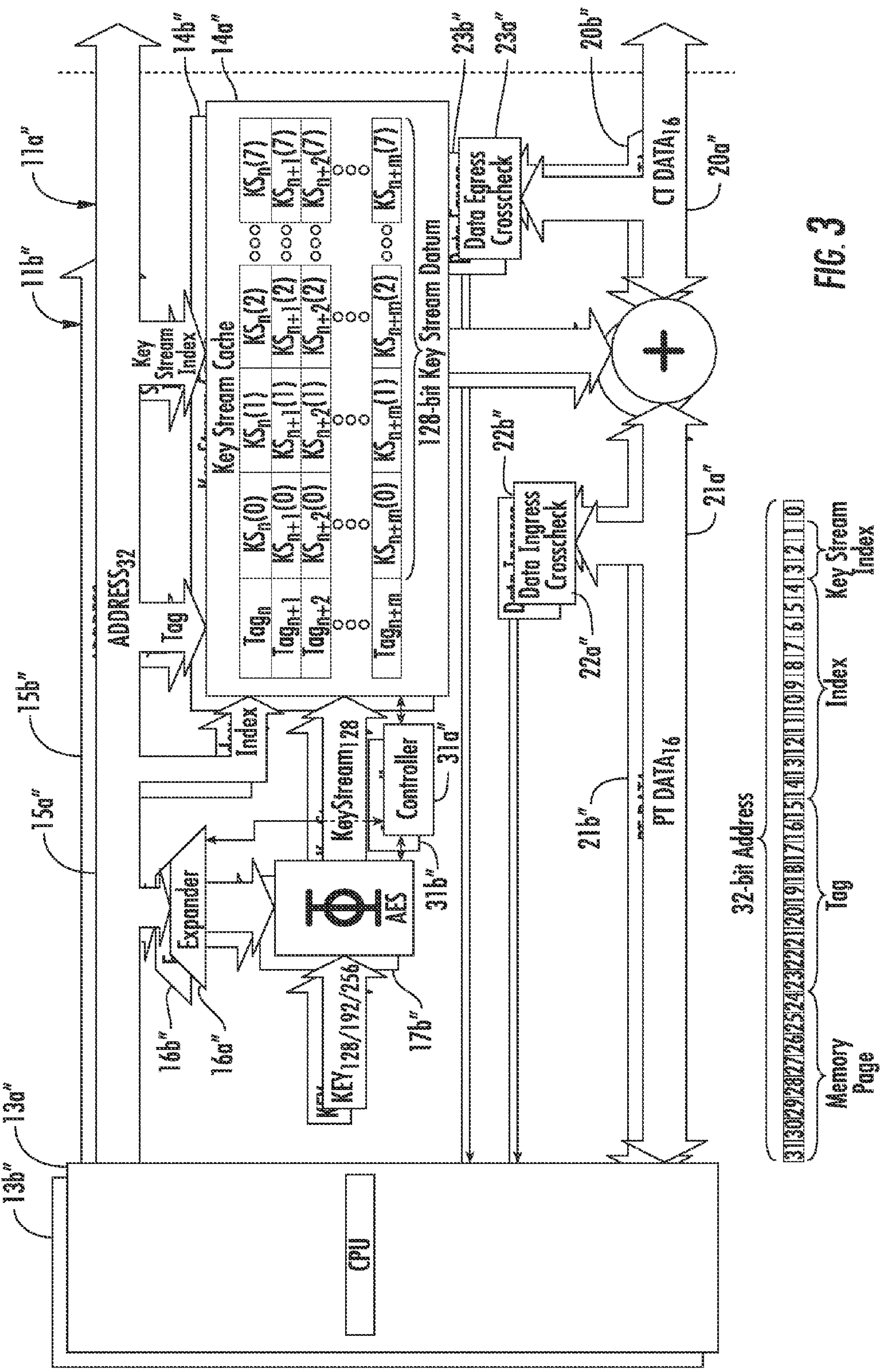
FIG. 3 is a detailed schematic diagram of yet another embodiment of the wireless communications device of FIG. 1.

The processor 11 is configured to cache a plurality of keystreams based upon an encryption key. For example, the processor 11 illustratively stores n+m keystreams (FIGS. 2-3). The processor 11 is also configured to generate decrypted plaintext based upon the cached plurality of keystreams and the encrypted data requested from the external memory 12. Advantageously, the CPU 13 efficiently accesses the encrypted external memory 12 using a cache of keystreams.

The processor 11 is illustratively configured to generate each address request comprising at least one of a key stream index value, an index value, a tag value, and a memory page value. The processor 11 is illustratively configured to operate based upon a direct mapped cache protocol. In other embodiments, the processor 11 may be configured to operate based upon other caching schemes, for example, two-way associative and four-way associative.

More specifically, the processor 11 is further configured to predict a plurality of future address requests. The future address requests may be respectively associated with the cached plurality of keystreams. The processor 11 also predicts the future address requests based upon at least one of a current address request and a past request address.

Another aspect is directed to a method of operating a secure processing device 10 including an external memory 12 storing encrypted data, and at least one processor 11 cooperating with the external memory. The method may comprise using the at least one processor 11 to generate a plurality of address requests for the encrypted data in the external memory 12, using the at least one processor to cache a plurality of keystreams based upon an encryption key, and using the at least one processor to generate decrypted plaintext based upon the cached plurality of keystreams and the encrypted data requested from the external memory.

As will be appreciated by those skilled in the art, the secure wireless communications device 10 provides a significant performance benefit over the typical secure memory approach. More specifically, with the adaptive caching of the keystreams, the CPU 13 can achieve greater speed and experience bursts when a greater number of address request keystreams are in the keystream cache 14 rather than accessing the external memory 12. Moreover, unlike typical secure memory devices that decrypt the entire memory at boot up, this secure wireless communications device 10 does not have long boot-up times. Moreover, the secure wireless communications device 10 keeps decrypted portions of memory to a minimum, thereby enhancing security.

Referring now to FIG. 2, another embodiment of a secure wireless communications device 10' is now described. In this embodiment of the secure wireless communications device 10', those elements already discussed above with respect to FIG. 1 are given prime notation and most require no further discussion herein. This embodiment differs from the previous embodiment in that the processor 11' further comprises an address bus 15' for transmitting address requests from the CPU 13' (illustratively 32-bits wide), a keystream cache 14' coupled to the address bus, and a keystream generator 18' upstream from the keystream cache.

Also, the keystream generator 18' illustratively includes an expander 16' coupled to the address bus 15' and for expanding the 32-bit address request to 128-bits, and an encryption engine 17' coupled to the expander and having a key input thereto to generate the plurality of keystreams (illustratively 128-bits wide). For example, the encryption engine 17' illustratively includes an advanced encryption standard (AES) engine. In other embodiments, the encryption engine 17' may use other encryptions regimes, for example, Data Encryption Standard (DES), RSA, and MEDLEY encryption standard.

Moreover, the processor 11' also illustratively includes a cipher text data bus 20' (illustratively 16 bits wide) communicating between the external memory (not shown) and the keystream cache 14'. The processor 11' also illustratively includes a plaintext data bus 21' (illustratively 16 bits wide) for transmitting plain text from the keystream cache 14' to the CPU 13'. The processor 11' also illustratively includes a keystream cache controller 31' cooperating with the expander 16', the encryption engine 17', and the keystream cache 14' to provide post-fetching/pre-fetching of keystreams and other management of the keystream cache system.

As discussed above in regards to the embodiment illustrated in FIG. 1, the processor 11, i.e. the key stream cache controller 31' within the key stream cache 14', is further configured to predict future address requests. As will be appreciated by those skilled in the art, the future and past address predictions are accomplished by taking advantage of both the sequential and the looping nature of the processor. The controller 31' within the key stream cache 14', on a cache miss, can generate a sequential range of key stream data for multiple addresses. The future/past prediction is accomplished by offsetting the processor's input address to the key stream cache 14' by the controller 31'.

Referring now to FIG. 3, another embodiment of a secure wireless communications device 10" is now described. In this embodiment of the secure wireless communications device 10", those elements already discussed above with respect to FIG. 2 are given double prime notation and most require no further discussion herein. This embodiment differs from the previous embodiment in that the secure wireless communications device 10" illustratively includes a plurality of processors 11$a$"-11$b$" operating in parallel. As will be appreciated by those skilled in the art, this embodiment is for high assurance applications, i.e. this embodiment includes redundancy. Further, in this embodiment, the processors 11$a$"-11$b$" illustratively each include a pair of data cross-checkers, one for data ingress 22$a$"-22$b$" and one for data egress 23$a$"-23$b$", cooperating with the plurality of processors operating in parallel. As will be appreciated by those skilled in the art, the cross-checkers determine whether the redundant systems are producing equivalent results.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A secure processing device comprising:

an external memory storing encrypted data; and at least one processor cooperating with said external memory and comprising a processing unit, an address bus coupled to said processing unit, a keystream cache coupled to said address bus, a summer coupled to said keystream cache, and an encryption engine coupled to said address bus and having a key input thereto to generate a plurality of keystreams;

said processing unit configured to generate a plurality of address requests for the encrypted data in said external memory, said address bus configured to provide in parallel the plurality of address requests to said keystream cache and said encryption engine, each address request comprising a keystream index value and a tag value;

said keystream cache configured to cache the plurality of keystreams based upon an encryption key;

said summer configured to generate decrypted plaintext based upon the cached plurality of keystreams and the encrypted data requested from said external memory; and said processing unit configured to predict a plurality of future address requests, and generate a sequential range of keystream data for a plurality of addresses based upon the cached plurality of keystreams.

2. The secure processing device according to claim 1 wherein the plurality of future address requests is respectively associated with the cached plurality of keystreams.

3. The secure processing device according to claim 2 wherein said processing unit is configured to predict the plurality of future address requests based upon at least one of a current address request and a past request address.

4. The secure processing device according to claim 1 wherein said at least one processor comprises a plurality thereof operating in parallel.

5. The secure processing device according to claim 4 further comprising at least one data cross-checker cooperating with said plurality of processors operating in parallel.

6. The secure processing device according to claim 1 wherein said at least one processor comprises an expander coupled to said address bus.

7. The secure processing device according to claim 1 wherein said encryption engine comprises an advanced encryption standard (AES) engine.

8. The secure processing device according to claim 1 wherein said at least one processor is further configured to operate based upon a direct mapped cache protocol.

9. A secure processing device comprising:

an external memory storing encrypted data; and a plurality of processors operating in parallel, cooperating with said external memory, and each comprising a processing unit, an address bus coupled to said processing unit, a keystream cache coupled to said address bus, a summer coupled to said keystream cache, and an encryption engine coupled to said address bus and having a key input thereto to generate a plurality of keystreams;

said processing unit configured to generate a plurality of address requests for the encrypted data in said external memory, each address request comprising a keystream index value and a tag value, said address bus configured to provide in parallel the plurality of address requests to said keystream cache and said encryption engine;

said keystream cache configured to cache the e plurality of keystreams based upon an encryption key;

said summer configured to generate decrypted plaintext based upon the cached plurality of keystreams and the encrypted data requested from said external memory; and said processing unit configured to predict a plurality of future address requests respectively associated with the cached plurality of keystreams, and generate a sequential range of keystream data for a plurality of addresses based upon the cached plurality of keystreams.

10. The secure processing device according to claim 9 wherein each of said processing units is configured to predict the plurality of future address requests based upon at least one of a current address request and a past request address.

11. The secure processing device according to claim 9 further comprising at least one data cross-checker cooperating with said plurality of processors operating in parallel.

12. The secure processing device according to claim 9 wherein each processor comprises an expander coupled to said address bus.

13. A method of operating a secure processing device including an external memory storing encrypted data, and at least one processor cooperating with the external memory and comprising a processing unit, an address bus coupled to the processing unit, a keystream cache coupled to the address bus, a summer coupled to the keystream cache, and an encryption engine coupled to the address bus, the method comprising:

using the encryption engine to generate a plurality of keystreams based upon a key input;

using the processing unit to generate a plurality of address requests for the encrypted data in the external memory, the address bus providing in parallel the plurality of address requests to the keystream cache and the encryption engine, each address request comprising a keystream index value and a tag value;

using the keystream cache at least one processor to cache the plurality of keystreams based upon an encryption key;

using the summer at least one processor to generate decrypted plaintext based upon the cached plurality of keystreams and the encrypted data requested from the external memory; and using the processing unit at least one processor to predict a plurality of future address requests, and generate a sequential range of keystream data for a plurality of addresses based upon the cached plurality of keystreams.

14. The method according to claim 13 wherein the plurality of future address requests is respectively associated with the cached plurality of keystreams.

15. The method according to claim 14 further comprising using the processing unit to predict the plurality of future address requests based upon at least one of a current address request and a past request address.

16. The method according to claim 13 wherein the at least one processor comprises a plurality thereof; and further comprising operating the plurality of processors in parallel.

* * * * *